C. G. Sargent,

Burring Wool.

No. 88,742.      Patented Apr. 6, 1869.

Witnesses:
A. B. Ely
A. R. Slocomb

Inventor:
Chas. Sargent

CHARLES G. SARGENT, OF WESTFORD, MASSACHUSETTS.

Letters Patent No. 88,742, dated April 6, 1869.

IMPROVEMENT IN BURRING-CYLINDERS FOR WOOL, &c.

The Schedule referred to in these Letters Patent and making part of the same.

Be it known that I, CHARLES G. SARGENT, of Westford, in the State of Massachusetts, have invented a new and useful Improvement in Cylinders for Burring Wool, Ginning Cotton, and cleaning fibrous substances, of which the following, with the drawings, is a full description.

It is well known to those conversant with cleaning wool, or other fibre, that none of the devices heretofore used perfectly clean out all the foreign matter, particularly those fine substances, and vegetable burrs, some portions of which become so thoroughly incorporated with the wool as to be found in the finished cloth after passing through all the manipulations of manufacturing.

When the foreign matter is very fine and minute, each tooth must be made so as to grasp only one or two fibres at a time, causing an even distribution of fibre over its surface, and insuring the separation of the foreign matter by the action of the guard or retaining-edge.

It has been found very difficult in manufacturing burring-cylinders to cut the teeth sufficiently small and fine to take the requisite quantity of fibre, and no tool has been made to cut the teeth small enough; and heretofore, when cylinders have been made, they have been made alike with the same quality or capacity of tooth for all purposes, or else it has been found necessary to make different cylinders for different kinds of work.

When the cylinders have been once made, the capacity of their teeth is fixed, and while they have been large enough for coarse fibre, they have never been small enough for the finest.

There have been no means used to vary the capacity of the tooth after the cylinder was once made.

My invention is intended to obviate these difficulties by the introduction of a soft binding or packing-wire between the rows of teeth.

By this means, the teeth of cylinders can be punched sufficiently large for the coarsest stock, and the capacity of the teeth can be regulated for any grade to the finest.

The wire being packed in under a pressure, tends to crowd into the notch of the tooth, while it diminishes its depth each side and strengthens and supports it, as well as regulates its quality or capacity for receiving fibre.

In this way, I make a new clothing for the cylinder, and a new surface, of hard teeth and soft wire.

To make a perfect cleaning-surface for the mestizo and Cape wools, this packing and binding wire must fill up between the rows of teeth to nearly an even surface, barely leaving a notch or tooth sufficient to catch a fibre or two of stock.

I believe this has never before been done in any cylinder.

Besides this, with this arrangement, as the tooth wears away, the binding-wire may be turned down on its top side and leave a tooth as good as at first, and so on till the tooth is worn out.

In the drawings—

Figure 1 is longitudinal view, showing toothed wire and soft packing-wire between.

Figures 6, 7:
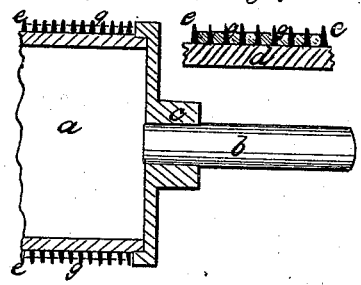
Figure 6 is a longitudinal section of part of fig. 5.

Figure 7, enlarged longitudinal section of surface of the same.

$a\ a$ is a hollow cylinder, with shafts $b\ b$ and heads $c\ c$.

$d$ is the shell of the cylinder.

Figure 1:
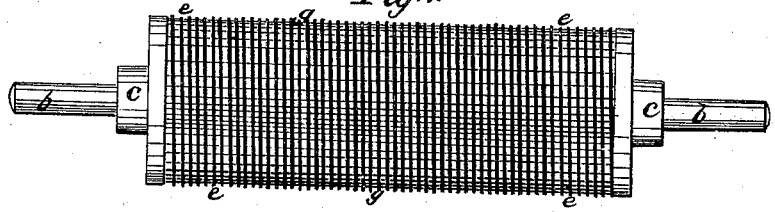
Figure 2:
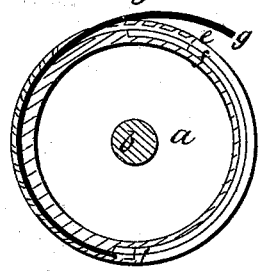
Figure 2 is cross-section, with toothed wire staked in a groove and packing-wire.
Figures 3, 4:
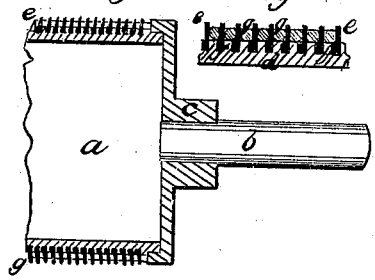
Figure 3 is longitudinal section of a portion of the above.
Figure 4 is enlarged longitudinal section of part of surface.

$e\ e$, figs. 2, 3, 4, is a ribbed toothed wire, the teeth being cut on the flat part above the rib.

$f\ f$, figs. 2 and 4, is a spiral groove, cut in the surface of the cylinder, in which the rib of the toothed wire is placed and staked down.

$g\ g$, figs. 2, 3, 4, is a packing-wire, of soft copper, or other soft metal, which is packed or crowded in between the rows of toothed wire.

Figure 5:
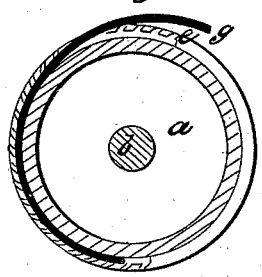
Figure 5 is a cross-section, with a ($\triangle$) delta-shaped toothed wire, an inverted ($\triangledown$) truncated delta-shaped packing-wire.

$e\ e$, figs. 5, 6, 7, is an angular toothed wire, and $g\ g$, figs. 5, 6, 7, is an angular packing-wire.

In covering or clothing the cylinder, I put it in a common screw-cutting lathe, and when I use the ribbed wire, I cut a thread or groove spirally on its entire length, and then wind the wire into the groove and stake it down. Then the soft packing-wire is wound round between the rows of toothed wire, a staking-roller being placed on it, so as to compress it very closely on the surface of the cylinder and between the toothed wire, and if the pressure is sufficient, it will crowd it also in between the teeth of the same row, more or less.

The wire may be flattened, or, in some cases, used round.

In some instances, I fasten one end of the toothed wire to the surface of the cylinder, and then set the lathe in motion and wind it round the whole length and fasten it, and then wind the soft wire between, applying the staking-roller, so as to press it firmly between the teeth, or both wires may be wound at once.

I thus produce a new surface of hard teeth and soft wire.

I am also enabled to vary and adjust the capacity of the teeth after they are made.

I am also enabled, by turning down the soft wire, to use the same cylinder for the same work, till the teeth are worn out.

I once obtained a patent for my wire-toothed clothed cylinder. I now desire a patent for my soft-wire packing clothed cylinder.

Teeth were old then; packing is old now; but wire teeth were new then, and wire packing is new now, as applied and used by me.

What I claim as my invention, is—

A cylinder, for opening and cleaning fibrous materials, &c., having a surface composed of alternate rows of hard teeth and soft packing-wire, the teeth being constructed substantially as shown, and the surface of the soft wire lying above the bases of the teeth and packing closely against the sides of the teeth, all substantially as and for the purposes described.

In testimony whereof, I have hereunto subscribed my name.

CHAS. G. SARGENT.

Witnesses:
A. B. ELY,
W. M. PARKER.